Jan. 13, 1931. D. H. B. REYNOLDS 1,788,845
APPARATUS FOR TESTING PIPE JOINTS FOR LEAKAGE
Filed Nov. 14, 1927 2 Sheets-Sheet 2
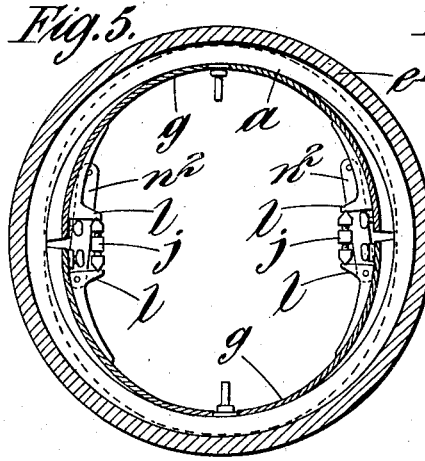
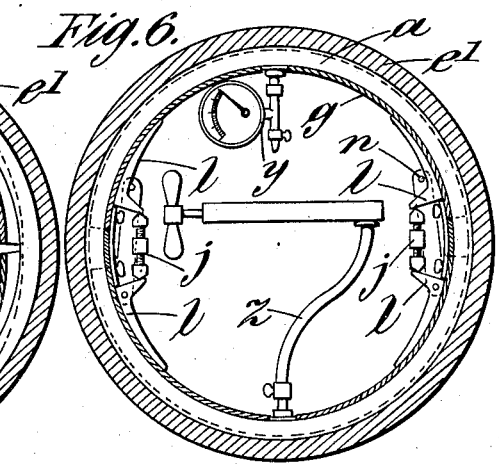
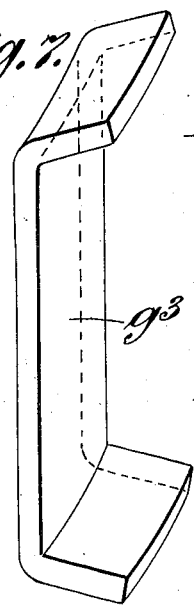
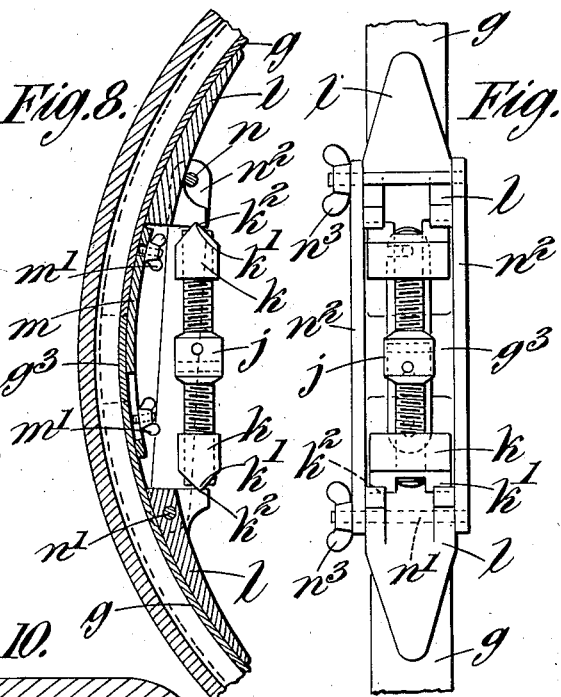
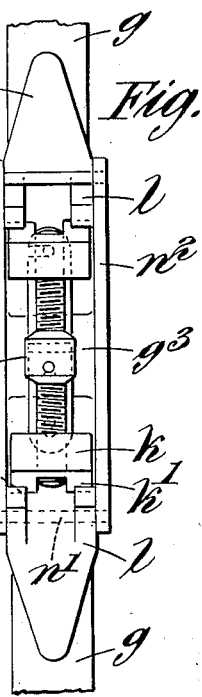
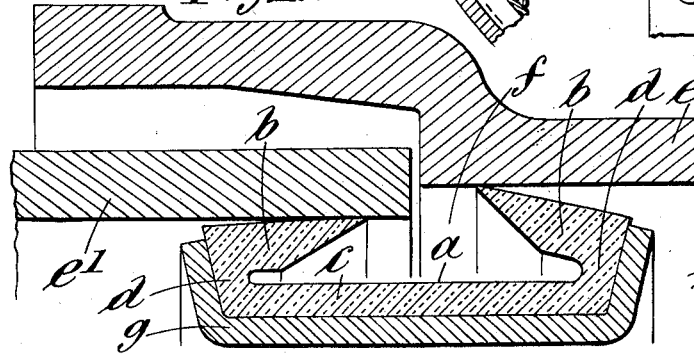
Donald Hugh Baillie Reynolds
Inventor,
Per
his Atty.

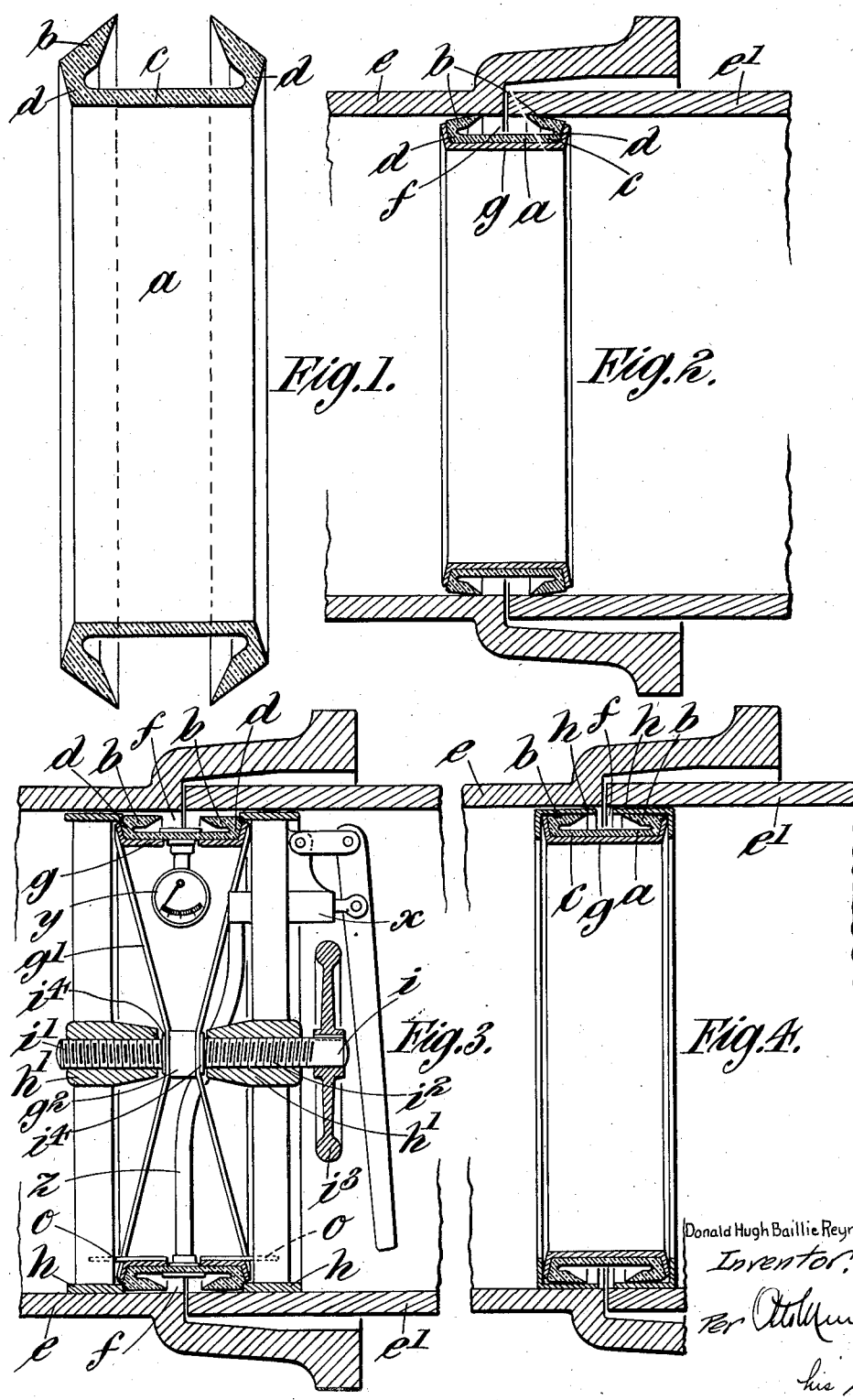

Patented Jan. 13, 1931

1,788,845

UNITED STATES PATENT OFFICE

DONALD HUGH BAILLIE REYNOLDS, OF ST. ALBANS, ENGLAND

APPARATUS FOR TESTING PIPE JOINTS FOR LEAKAGE

Application filed November 14, 1927, Serial No. 233,048, and in Great Britain November 25, 1926.

This invention relates to improvements in pipe joint testing devices in which a temporary joint is made by a flexible ring of a U cross section applied to the ends of two pipes in juxtaposition whereby a sealed cavity is formed opposite the pipe joint, which can be filled with fluid under pressure in order to test the integrity of the joint, and has for its object the provison of means whereby the temporary joints of the sealed cavity can be more effectively made in a simple and automatic manner by the testing pressure than has been possible heretofore, and at the same time the device is adapted to accommodate itself automatically to the conditions which nearly always occur in practical work, namely;—the absence of co-axial and constant diametral conditions of the two adjacent pipes at the pipe joint.

The invention consists in the provision of a continuous jointing ring of flexible material of a U cross section, having inwardly turned resilient lips angularly disposed to and adapted to lie with their edges only against the internal periphery of the two pipes so as to leave a space between that part of each lip remote from the said edges and the pipe, a housing enclosing part of said ring so as to be held thereby in a floating condition; the said housing having a continuity of circumferential surface for supporting the said ring when in position for conditions of test, means for creating a pressure within said ring for testing purposes and means for measuring said pressure.

In the drawings:—

Figure 1 is a cross sectional elevation of a resilient ring particularly suited for use in the improved pipe joint testing apparatus forming the subject of the present invention;

Figure 2 shows a ring similar to that illustrated in Figure 1 in position in a pipe in proximity to a joint;

Figure 3 illustrates one form of apparatus for introducing into a pipe, the resilient ring and the housing for continuously supporting said ring;

Figure 4 illustrates an alternative method of introducing into a pipe, the resilient ring and the housing affording it continuous support;

Figure 5 illustrates an alternative construction in which the housing is divided into two parts which are illustrated as in an unstressed condition;

Figure 6 is a similar view to Figure 5 but with the housing stressed into operative position and having distance pieces inserted to give continuity of support to the resilient ring;

Figure 7 is a perspective view of a short portion of the housing suitable for use as a distance piece in the construction illustrated in Figures 5, 6, 8 and 9;

Figure 8 is a detail view showing the stressing means employed in Figure 6, but drawn to a larger scale;

Figure 9 is a side view of Figure 8, parts being shown in section to facilitate description;

Figure 10 is a fragmentary view showing a modified form of housing which readily permits the resilient ring to accommodate itself to the surfaces of two adjacent pipe lengths when the surface of the one is not a continuation of the surface of the other and to maintain the floating relation between the apparatus and the pipes.

On reference to Figure 1 it will be seen that the resilient ring $a$ comprises two lips $bb$ which in unrestrained condition are angularly disposed relative to the body $c$ of the ring, said lips $bb$ being connected to the body $c$ by inclined parts $dd$.

When such a ring is located in two pipes $e$ and $e^1$ of suitable diameter as illustrated in Figure 2, the lips $bb$ are deflected and a reliable seal is made between the extreme edges of the lips $bb$ and the inner surfaces of the pipes $e$ and $e^1$ thus forming a sealed annular cavity $f$ into which testing fluid under pressure can be forced, the loss in pressure during a given interval of time being an indication of the leakage through the joint under test.

In order to support the resilient ring $a$ and prevent its collapse by the testing pressure it is internally supported by a housing $g$ having a continuous surface, the diameters of the various parts being such, that when in place, the body of the ring $a$ and the internal housing $g$ are floatingly supported by the lips $bb$.

To enable a device comprising a ring $a$ and housing $g$ to be introduced into a pipe, means may be provided whereby the lips $bb$ of the ring $a$ can be temporarily deflected to an abnormal extent.

As illustrated in Figure 3 this is effected by applying lateral stress to the parts $dd$ of the resilient ring $a$ thus deflecting the edges of the lips $bb$ temporarily into a circle of smaller diameter than the pipe under test.

In this construction the housing $g$ is supported by a spider $g^1$ having a bushing $g^2$ which is positioned between shoulders or collars $i^4$ on a shaft $i$, the bore of the bushing $g^2$ being of greater diameter than the diameter of that part of the shaft $i$ between the collars $i^4$ so as to permit of radial movement of the bushing $g^2$ relatively to the shaft $i$. The shaft $i$ is also provided with two screw threads $i^1$ and $i^2$ the obliquity of which are in opposite directions, and a hand wheel $i^3$.

The parts $dd$ of the ring $a$ are engaged by two elements each having a flange $h$ and a hub $h^1$ said hubs $h^1h^1$ being suitably threaded to engage respectively with the screw threads $i^1$ and $i^2$ so that upon rotation of the hollow shaft $i$ by the hand wheel $i^3$ the flanged elements can be made to approach to or to recede from the spider $g^1$, relative rotation between the spider $g^1$ and the elements being prevented by the projections $o$ on the housing $g$.

In use the shaft $i$ is rotated so as to compress the parts $dd$ of the ring $a$ laterally and thus deflect the lips $bb$ to a diameter which is smaller than that of the pipes $ee^1$.

The device as a whole is then passed into the pipe line and arranged with the space between the lips $bb$ in proximity with the joint under test.

As soon as the device is correctly positioned the shaft $i$ is rotated to displace the flanged elements relatively to one another and relieve the lateral stress on the parts $dd$ of the ring $a$ thus allowing the lips $bb$ to come into sealing contact with the surfaces of the pipes $e$ and $e^1$ and form the sealed annular cavity $f$.

Upon release of the lateral stress the flanged elements and operating gear are entirely supported by the flanges $hh$ resting upon the internal surface of the pipes $e$ and $e^1$ and the housing $g$ is floatingly supported on the lips $bb$ which are not loaded with the weight of the flanged elements, shaft $i$ and hand wheel $i^3$.

Testing fluid under pressure is now introduced by the pump $x$ through the pipe $z$ and the pressure duly noted on the gauge $y$ which is in communication with the space $f$.

In Figure 4 the lips $bb$ are temporarily abnormally deflected by two elements the flanges $hh$ of which are passed over the lips $bb$ before the device is introduced into the pipes $e$ and $e^1$, the joint between which is to be tested; the operation of the elements being effected by any suitable mechanism, such for example, as that hereinbefore described in connection with Figure 3.

When the ring $a$ is correctly located relative to the joint to be tested, the flanges $hh$ of the flanged elements are displaced laterally, without displacing the ring $a$, and the lips $bb$ spring into contact with the inner surfaces of the pipes $e$ and $e^1$ so as to form a sealed annular cavity $f$ as before.

When the resilient ring $a$ is to be introduced into a pipe of considerable size it has been found in some instances to be more convenient to divide the housing $g$ into two or more parts and to arrange jacking screws between the ends of the parts. In order to maintain continuity of support by the housing $g$ under testing conditions, distance pieces are introduced between the ends of the divided parts of the housing $g$.

Experience with devices involving relative movement of a housing such as $g$ and a ring such as $a$ during positioning has shown that grave difficulties exist. In the present invention means are provided whereby the parts of the housing $g$ are expanded without any material relative motion between them and the resilient ring $a$.

On reference to Figures 5 and 6, it will be seen in Figure 5 that the housing $g$ is divided into two parts and that the contour of the parts is such that when the two parts are assembled end to end an elongated shape is produced.

Between the ends of the parts of the housing $g$ jacking screws $j$ are provided each of the screws $j$ having two nuts $k$ with knife edges $k^1$ for engagement with grooves $k^2$ formed in lugs $l$ mounted on to the parts of the housing $g$ in any suitable manner such as by screws or rivets or by welding.

The ends of the parts of the housing $g$ extend somewhat beyond the end faces of the lugs $l$ in order to enable a backing plate $m$ to be introduced. The backing plate $m$ supports a short section $g^3$ of the housing in order that the continuity of surface of the housing $g$ may be maintained and to prevent the parts of the housing $g$ being displaced transversely to one another bails $n$ are provided, each of said bails $n$ being pivoted at $n^1$ in one of the lugs $l$ and comprising two side members $n^2$ which engage with the sides of the lugs $l$ when correctly positioned.

In order to facilitate the operation of the bail $n$ the side members $n^2$ can be loosened and after adjustment can be clamped securely in position by means of the finger operable nuts $n^3$.

When the joints in pipes having a diameter of three feet or more are to be tested the resilient ring $a$ is first introduced into the pipe with the lower part of the housing $g$ resting upon it and correctly positioned relatively to the joint to be tested, that is to say, with the joint positioned between the lips $bb$ and then the upper part of the housing $g$ is introduced into place.

In the case of smaller pipes having a diameter of say between two feet and three feet, the parts of the housing $g$ are assembled with the resilient ring $a$, and as a whole introduced bodily into the pipes.

As soon as all the parts of the housing $g$ are properly associated with the ring $a$ in position the jacking screws $j$ are located between the lugs $l$ on each side and operated so as to expand and to deform the parts of the housing $g$ sufficiently to enable the sections $g^3$ to be introduced when the bails $n$ are temporarily hinged back out of the way.

When the sections $g^3$ are in place, the backing plates $m$ are placed in position and the finger operable nuts $m^1$ are lightly tightened; the jacking screws $j$ are now rotated to relieve the stress thus enabling the radial ends of the parts of the housing $g$ to engage with the radial ends of the sections $g^3$, so as to form a continuous supporting surface for the ring $a$.

The finger operable nuts $m^1$ are now further tightened and the bails $n$ are placed in correct position, thus accurately registering all the parts in operative position, with the rim $g$ supporting the resilient ring $a$ at all points and itself being floatingly supported by the ring $a$ (see Figure 6).

When spigoted pipes of considerable diameter are laid, it is essential that the sealing material shall be evenly distributed around the joint in order that efficient and regular caulking can be effected. Owing to irregularities in manufacture this regular disposition of sealing material displaces the inner surface of one length of pipe relatively to the inner surface of the next length of pipe and if an effective seal is to be made between both lengths of pipe and the lips $bb$ in order to test the joint it is necessary to provide for considerable accommodation in the device.

As illustrated in Figure 10 although the surface of the section $e$ is illustrated considerably below the surface of the section $e^1$ both lips $bb$ make effective sealing contact with the surfaces, thus enabling joints as commonly made with commercial piping to be tested effectively even when adjacent pipes differ slightly in shape or internal diameter and are not co-axially arranged relatively to one another.

In order to make a satisfactory test of a joint between two pipes of slightly different internal diameters it is necessary to modify the projecting flanges of the housing $g$. As illustrated in Figure 10, one of the flanges of the housing $g$ is of greater width than the other in order that ample clearance over any local irregularities in the surfaces of the pipes is provided for and the floating condition maintained.

I claim:—

1. An improved pipe joint testing device comprising a continuous jointing ring of flexible material and of U cross section, having inwardly turned resilient lips angularly disposed relatively to the internal surfaces of the pipes the joint between which is being tested and adapted to cooperate with the surfaces of the pipes in a leak proof manner, a housing enclosing part of said ring so as to be held thereby in a floating condition, the said housing having a continuity of uniform circumferential surface for supporting said ring when under testing conditions, means for creating a pressure within said ring for testing purposes and means for measuring said pressure.

2. In a testing device as claimed in claim 1, said joining ring having inclined surfaces adjacent the lips and means for angularly displacing said surfaces so as to deflect the said lips and permit of the device being passed through the pipes the joint of which is to be tested and applied to said joint.

3. In a testing device as claimed in claim 1, said housing being in two segments of a less radius when not in use than when in use, lugs on said segments, expanding means engaging adjacent lugs for forcing the ends of the segments outward in a radial direction and at the same time reducing the curvature of said segments, and packing pieces for completely filling the gaps between the ends of the segments and thus provide continuity of periphery for supporting the flexible ring on the release of the expanding means.

4. In a testing device as claimed in claim 1, the said housing being in a plurality of segments of a less radius when not in use than when in use, lugs on said segments, expanding means engaging adjacent lugs for forcing the ends of the segments outward in a radial direction and at the same time reducing the curvature of said segments, and packing pieces for completely filling the gaps between the ends of the segments and thus provide continuity of periphery for supporting the flexible ring on the release of the expanding means.

5. In a testing device as claimed in claim 1, the said housing being in a plurality of segments of a less radius when not in use than when in use, lugs on said segments, expanding means engaging adjacent lugs for forcing the ends of the segments outward in a radial direction and at the same time reducing the curvature of said segments, backing pieces for completely filling the gaps between the ends of the segments and thus provide continuity of periphery for supporting the flexible ring on the release of the expanding means and pivotally mounted members on the segments for engagement with adjacent segments so as to register all the segments in operative position relatively to one another.

DONALD HUGH BAILLIE REYNOLDS.